US012722978B1

(12) United States Patent
Watson et al.

(10) Patent No.: US 12,722,978 B1
(45) Date of Patent: Sep. 1, 2026

(54) PROCESS FOR PURIFYING AND PRODUCING A HIGH PURITY PARTICULATE GRAPHITE MATERIAL FOR USE IN LITHIUM-ION BATTERIES

(71) Applicant: GREEN GRAPHITE TECHNOLOGIES, INC., Montréal (CA)

(72) Inventors: Kevin Watson, Montréal (CA); Balaji Venkatesh, Kingston (CA); Boyd Davis, Kingston (CA); Alain Roy, Kingston (CA)

(73) Assignee: GREEN GRAPHITE TECHNOLOGIES, INC., Montréal (CA)

( * ) Notice: Subject to any disclaimer, the term of this patent is extended or adjusted under 35 U.S.C. 154(b) by 343 days.

(21) Appl. No.: 18/269,832

(22) PCT Filed: Aug. 18, 2022

(86) PCT No.: PCT/CA2022/051255
§ 371 (c)(1),
(2) Date: Jun. 27, 2023

(87) PCT Pub. No.: WO2023/019361
PCT Pub. Date: Feb. 23, 2023

Related U.S. Application Data

(60) Provisional application No. 63/260,370, filed on Aug. 18, 2021.

(51) Int. Cl.
*C01B 32/215* (2017.01)
*H01M 10/0525* (2010.01)

(52) U.S. Cl.
CPC ....... *C01B 32/215* (2017.08); *H01M 10/0525* (2013.01); *C01P 2004/61* (2013.01);
(Continued)

(58) Field of Classification Search
None
See application file for complete search history.

(56) References Cited

U.S. PATENT DOCUMENTS 2,914,383 A 11/1959 Ulrich
8,491,677 B2 7/2013 Edwards
(Continued)

FOREIGN PATENT DOCUMENTS

CN 1040638 C 11/1998
CN 101367517 8/2011
(Continued)

OTHER PUBLICATIONS

International Search Report and Written Opinion issued in corresponding International application PCT/CA2022/051255 mailed Nov. 10, 2022.

(Continued)

*Primary Examiner* — Keling Zhang
(74) *Attorney, Agent, or Firm* — NORTON ROSE FULBRIGHT US LLP

(57) ABSTRACT

A process for purifying and producing coated high purity particulate graphite materials suitable for use in lithium-ion batteries (LiBs) is described herein. More specifically, the process comprises agglomerating a graphite feed or treating a graphite feed with an agglomerating agent to produce an agglomerated particulate graphite feed; and reacting the agglomerated particulate graphite feed in the presence of a chlorine-containing gas to produce a mixture comprising a purified agglomerated particulate graphite material and a chlorine-containing gas laden with chlorinated impurities. The process may further comprise an alkaline leaching step. A coated particulate graphite material comprising a purity in excess of 99.95 wt. % C. and its use as anode material in rechargeable LiBs is also disclosed.

19 Claims, 3 Drawing Sheets

Figure 1:
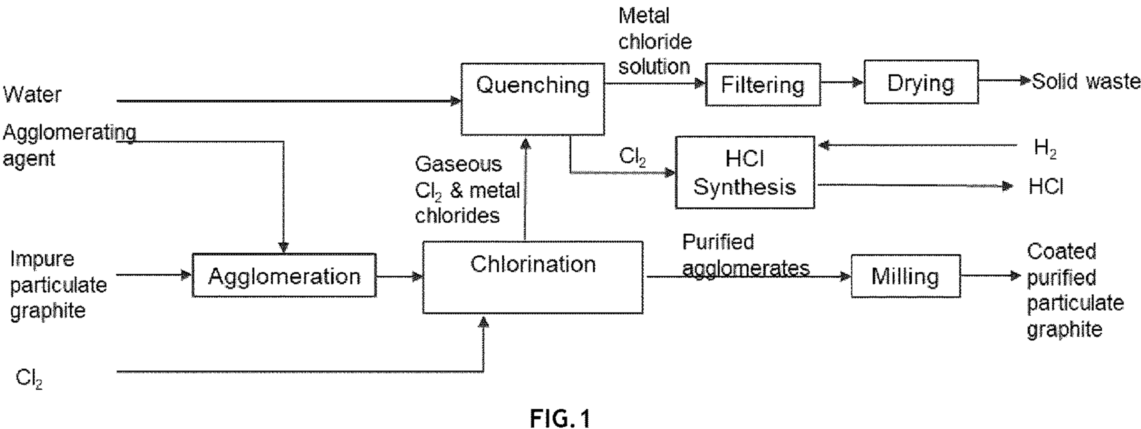

(52) U.S. Cl.
CPC ...... *C01P 2004/84* (2013.01); *C01P 2006/40* (2013.01); *C01P 2006/80* (2013.01)

(56) References Cited

U.S. PATENT DOCUMENTS

| | | | |
|---|---|---|---|
| 2021/0057734 | A1 | 2/2021 | de Savio Silva et al. |
| 2022/0393171 | A1 | 12/2022 | Zhou et al. |

FOREIGN PATENT DOCUMENTS

| | | |
|---|---|---|
| CN | 109524736 | 3/2019 |
| CN | 109867281 | 6/2019 |
| CN | 111137884 | 5/2020 |
| EP | 3735395 | 11/2020 |
| JP | S59169077 | 9/1984 |
| JP | 2004286627 | 10/2004 |
| KR | 102002129 | 7/2019 |
| WO | WO 2019/134029 | 7/2019 |
| WO | WO 2021/141460 | 7/2021 |

OTHER PUBLICATIONS

Partial Supplementary European Search Report issued in corresponding European Application No. 22857183.2, dated Oct. 10, 2025.
Examination Report issued in corresponding Indian Application No. 202427019870, dated Jan. 21, 2026.
Extended European Search Report issued in corresponding European Application No. 22857183.2, dated Feb. 4, 2026.
Office Action issued in corresponding Korean Application No. 10-2024-7006442, dated Feb. 4, 2026.

PROCESS FOR PURIFYING AND PRODUCING A HIGH PURITY PARTICULATE GRAPHITE MATERIAL FOR USE IN LITHIUM-ION BATTERIES

CROSS REFERENCE TO RELATED APPLICATIONS

This application is a national phase application under 35 U.S.C. § 371 of International Application No. PCT/CA2022/051255 filed Aug. 18, 2022, which claims the benefit of U.S. Provisional Application 63/260,370, filed Aug. 18, 2021. The contents of the referenced application are incorporated into the present application by reference.

BACKGROUND

1. Field

This disclosure relates to the field of physical and chemical purification. More specifically, but not exclusively, the present disclosure broadly relates to the physical and chemical purification of graphite. Yet more specifically, but not exclusively, the present disclosure broadly relates to a process for purifying and producing a high purity particulate graphite material suitable for use in batteries. Yet more specifically, but not exclusively, the present disclosure broadly relates to a process for purifying and producing coated high purity graphite particles suitable for use in batteries. The present disclosure also relates to high purity particulate graphite particles and coated high purity particulate graphite particles, and their use as the anode material in rechargeable lithium-ion batteries (LiBs).

2. Related Art

All LiBs use particulate graphite as the anodic electrode material. The graphite is typically in the particle size range of 5-30 microns. A key requirement for the graphite is that it must have a low impurity content, with the typical industry standard being≤500 ppm total impurities on a weight basis.

There are two general sources of graphite for LiBs: synthetic graphite and mined natural flake graphite (NFG). The standard mined NFG product is a concentrate with a purity in the range of 92-98 wt. % carbon and must therefore be purified before it can be used in LiBs.

There are currently two methods practiced at the commercial scale to purify NFG for use in LIBs. The first method uses hydrofluoric acid (HF) and other acids in combination to remove the impurities by solubilizing them, such as described in CN 101367517B which is incorporated herein by reference. The method is able to purify the NFG to the >99.95 wt % C specification. However, there are significant disadvantages with this method. Firstly, HF is an extremely hazardous material in the liquid or vapour form, and its use entails managing significant health, safety and environmental challenges. Secondly, HF is an expensive reagent, and given the quantity typically required, this purification method has high processing costs. And thirdly, the method produces a large amount of fluoride-contaminated liquid and solid waste that must be disposed in an environmentally acceptable manner.

The second method practiced at the commercial scale to purify NFG for use in LiBs uses extremely high temperatures (e.g., >2,500° C.) to remove the impurities as volatiles in the gas phase. There are significant technical challenges with this method. Firstly, there is the challenge of achieving temperatures >2,500° C. in a system that allows for the large-scale processing of graphite while preventing oxidation. Secondly, and associated with the first issue, is the short life of the reactors and subsequent high operating cost. Thirdly, there is the challenge of processing very fine graphite particles in a controllable and efficient manner. The implications of these challenges are that the furnaces used for this method are of very high cost and are limited in specific throughput capacity.

As such, an improved process for purifying and producing a high purity particulate graphite material from synthetic graphite or NFG, suitable for use in LiBs, and overcoming the technical and economic limitations of the existing commercial processes is of commercial interest.

SUMMARY

The present disclosure broadly relates to a process for purifying and producing a high purity particulate graphite material suitable for use in batteries. The present disclosure also relates to a process for purifying and producing coated high purity graphite particles suitable for use in batteries. In an aspect of the present disclosure, the coating comprises a carbon coating. The present disclosure also relates to high purity particulate graphite particles, and their use as anode material in rechargeable lithium-ion batteries (LiBs). The present disclosure also relates to coated high purity particulate graphite particles, and their use as anode material in rechargeable lithium-ion batteries (LiBs). In an aspect of the present disclosure, the coating comprises a carbon coating. In a further aspect of the present disclosure, the high purity particulate graphite particles exhibit a purity in excess of 99.95 wt. % C.

In an aspect, the present disclosure relates to a process for purifying graphite, the process comprising: reacting a particulate graphite feed in the presence of a chlorine-containing gas to produce a mixture comprising a purified particulate graphite material and a chlorine-containing gas laden with chlorinated impurities; and separating the purified particulate graphite material from the mixture.

In an aspect, the present disclosure relates to a process for purifying graphite, the process comprising: treating a particulate graphite feed with an agglomerating agent producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a process for purifying graphite, the process comprising: leaching the particulate graphite feed using an alkaline leaching solution to produce a leached graphite feed material; treating the leached graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a process for purifying graphite, the process comprising: agglomerating a particulate graphite feed using mechanical means producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a process for purifying graphite, the process comprising: leaching a particulate graphite feed using an alkaline leaching solution to produce a leached graphite feed material; agglomerating the leached graphite feed using mechanical means producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a process for purifying graphite, the process comprising: agglomerating the particulate graphite feed using mechanical briquetting, with or without an agglomerating agent, to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a process for purifying graphite, the process comprising: leaching the particulate graphite feed using an alkaline leaching solution to produce a leached graphite feed material; agglomerating the particulate graphite feed using mechanical briquetting, with or without an agglomerating agent, to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture.

In an aspect, the present disclosure relates to a particulate graphite material comprising a purity in excess of 99.95 wt. % C.

In an aspect, the present disclosure relates to an anode material for lithium-ion batteries (LiBs) comprising a particulate graphite material of purity in excess of 99.95 wt. % C.

In an aspect, the present disclosure relates to a graphite particle for lithium-ion batteries (LiBs), wherein the graphite particle has a purity in excess of 99.95 wt. % C.

In an aspect, the present disclosure relates to a graphite particle for lithium-ion batteries (LiBs), wherein the graphite particle has a purity in excess of 99.95 wt. % C and wherein a calcined binder material connects to at least a part of the graphite particle's surface.

In an aspect, the present disclosure relates to a graphite particle for lithium-ion batteries (LiBs), wherein the graphite particle has a purity in excess of 99.95 wt. % C and wherein the graphite particle comprises a carbon coating.

Also disclosed in the context of the present disclosure are embodiments 1 to 155. Embodiment 1 is a process for purifying graphite, the process comprising: reacting a particulate graphite feed in the presence of a chlorine-containing gas to produce a mixture comprising a purified particulate graphite material and a chlorine-containing gas laden with chlorinated impurities; and separating the purified particulate graphite material from the mixture. Embodiment 2 is the process of embodiment 1, further comprising leaching the particulate graphite feed using an alkaline leaching solution to produce a slurry; and subjecting the slurry to a separation step, wherein the leaching is preformed prior to reacting with the chlorine-containing gas. Embodiment 3 is the process of embodiment 1 or 2, further comprising treating the particulate graphite feed with an agglomerating agent. Embodiment 4 is the process of any one of embodiments 1 to 3, wherein the chlorine-containing gas laden with chlorinated impurities is quenched to remove the impurities. Embodiment 5 is the process of embodiment 4, wherein the chlorinated impurities comprise metal chlorides. Embodiment 6 is the process of embodiment 2, wherein the leaching is performed using an aqueous NaOH solution or an aqueous KOH solution. Embodiment 7 is the process of embodiment 6, wherein the aqueous NaOH solution comprises from about 10 wt. % to about 50 wt. % NaOH. Embodiment 8 is the process of embodiment 6 or 7, wherein the leaching is performed at a temperature ranging from about 50° C. to about 150° C. Embodiment 9 is the process of any one of embodiments 6 to 8, wherein the leaching is performed over a period ranging from about 15 minutes to about 16 hours. Embodiment 10 is the process of embodiment 3, wherein the agglomerating agent comprises a carbonaceous binding agent. Embodiment 11 is the process of embodiment 10, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 12 is the process of embodiment 3, wherein the agglomerating agent comprises an organic resinous binding material. Embodiment 13 is the process of embodiment 12, wherein the organic resinous binding material is at least one of petroleum or coal tar pitch. Embodiment 14 is the process of any one of embodiments 1 to 13, wherein the reaction with the chlorine-containing gas is performed at a temperature ranging from about 800° C. to about 1800° C. Embodiment 15 is the process of any one of embodiments 1 to 14, wherein the reaction with the chlorine-containing gas is performed over a period ranging from about 10 minutes to about 8 hours. Embodiment 16 is the process of any one of embodiments 1 to 15, wherein the particulate graphite feed is at least one of synthetic graphite, mined natural flake graphite (NFG) or graphite recovered from spent LiBs. Embodiment 17 is the process of any one of embodiments 1 to 16, further comprising milling the purified particulate graphite material to a particle size ranging from about 5 to about 30 microns. Embodiment 18 is the process of any one of embodiments 1 to 17, wherein the purified particulate graphite material comprises a carbonized coating. Embodiment 19 is the process of any one of embodiments 1 to 18, wherein the purified particulate graphite material comprises a purity in excess of 99.95 wt. % C. Embodiment 20 is the process of embodiment 4, further comprising recycling the quenched chlorine-containing gas back to the process. Embodiment 21 is the process of embodiment 6, further comprising recycling the NaOH or KOH values back to the process. Embodiment 22 is the process of embodiment 21, wherein the NaOH or KOH solution is neutralized to produce a NaCl or KCl solution. Embodiment 23 is the process of any one of embodiments 20 to 22, wherein the recycling comprises the use of a chlor-alkali system.

Embodiment 24 is a process for purifying graphite, the process comprising: treating a particulate graphite feed with an agglomerating agent producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture. Embodiment 25 is the process of embodiment 24, further comprising leaching the particulate graphite feed using an alkaline leaching solution to produce a slurry; and subjecting the slurry to a separation step, wherein the leaching is performed prior to treating with the agglomerating agent. Embodiment 26 is the process of embodiment 24 or 25, wherein the chlorine-containing gas laden with chlorinated impurities is quenched to remove the impurities. Embodiment 27 is the process of embodiment 26, wherein the chlorinated impurities comprise metal chlorides. Embodiment 28 is the process of embodiment 25, wherein the leaching is performed using an aqueous NaOH solution or an aqueous KOH solution. Embodiment 29 is the process of embodiment 28, wherein the aqueous NaOH solution comprises from about 10 wt. % to about 50 wt. % NaOH. Embodiment 30 is the process of embodiment 25, 28 or 29, wherein the leaching is performed at a temperature ranging from about 50° C. to about 150° C. Embodiment 31 is the process of embodiment 25, 28, 29 or 30, wherein the leaching is performed over a period ranging from about 15 minutes to about 16 hours. Embodiment 32 is the process of any one of embodiments 24 to 31, wherein the agglomerating agent comprises a carbonaceous binding agent. Embodiment 33 is the process of embodiment 32, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 34 is the process of any one of embodiments 24 to 31, wherein the agglomerating agent comprises an organic resinous material. Embodiment 35 is the process of embodiment 34, wherein the organic resinous material is at least one of petroleum or coal tar pitch. Embodiment 36 is the process of any one of embodiments 24 to 35, wherein the reaction with the chlorine-containing gas is performed at a temperature ranging from about 800° C. to about 1800° C. Embodiment 37 is the process of any one of embodiments 24 to 36, wherein the reaction with the chlorine-containing gas is performed over a period ranging from about 10 minutes to about 8 hours. Embodiment 38 is the process of any one of embodiments 24 to 37, wherein the particulate graphite feed is at least one of synthetic graphite, mined natural flake graphite (NFG) or graphite recovered from spent LiBs. Embodiment 39 is the process of any one of embodiments 24 to 38, further comprising milling the purified agglomerated particulate graphite material to a particle size ranging from about 5 to about 30 microns. Embodiment 40 is the process of any one of embodiments 24 to 39, wherein the purified agglomerated particulate graphite material comprises a carbonized coating. Embodiment 41 is the process of any one of embodiments 24 to 40, wherein the purified agglomerated particulate graphite material comprises a purity in excess of 99.95 wt. % C. Embodiment 42 is the process of embodiment 26 or 27, further comprising recycling the quenched chlorine-containing gas back to the process. Embodiment 43 is the process of embodiment 28, further comprising recycling the NaOH or KOH values back to the process. Embodiment 44 is the process of embodiment 43, wherein the NaOH or KOH solution is neutralized to produce an NaCl or KCl solution. Embodiment 45 is the process of any one of embodiments 42 to 44, wherein the recycling comprises the use of a chlor-alkali system.

Embodiment 46 is a process for purifying graphite, the process comprising: leaching a particulate graphite feed using an alkaline leaching solution to produce a leached graphite feed material; treating the leached graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture. Embodiment 47 is the process of embodiment 46, wherein the chlorine-containing gas laden with chlorinated impurities is quenched to remove the impurities. Embodiment 48 is the process of embodiment 47, wherein the chlorinated impurities comprise metal chlorides. Embodiment 49 is the process of any one of embodiments 45 to 48, wherein the leaching is performed using an aqueous NaOH solution or an aqueous KOH solution. Embodiment 50 is the process of embodiment 49, wherein the aqueous NaOH solution comprises from about 10 wt. % to about 50 wt. % NaOH. Embodiment 51 is the process of any one of embodiments 46 to 50, wherein the leaching is performed at a temperature ranging from about 50° C. to about 150° C. Embodiment 52 is the process of any one of embodiments 46 to 51, wherein the leaching is performed over a period ranging from about 15 minutes to about 16 hours. Embodiment 53 is the process of any one of embodiments 46 to 52, wherein the agglomerating agent comprises a carbonaceous binding agent. Embodiment 54 is the process of embodiment 53, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 55 is the process of any one of embodiments 46 to 52, wherein the agglomerating agent comprises an organic resinous material. Embodiment 56 is the process of embodiment 55, wherein the organic resinous material is at least one of petroleum or coal tar pitch. Embodiment 57 is the process of any one of embodiments 46 to 56, wherein the reaction with the chlorine-containing gas is performed at a temperature ranging from about 800° C. to about 1800° C. Embodiment 58 is the process of any one of embodiments 46 to 57, wherein the reaction with the chlorine-containing gas is performed over a period ranging from about 10 minutes to about 8 hours. Embodiment 59 is the process of any one of embodiments 46 to 58, wherein the particulate graphite feed is at least one of synthetic graphite, mined natural flake graphite (NFG) or graphite recovered from spent LiBs. Embodiment 60 is the process of any one of embodiments 46 to 59, further comprising milling the purified agglomerated particulate graphite material to a particle size ranging from about 5 to about 30 microns. Embodiment 61 is the process of any one of embodiments 46 to 60, wherein the purified agglomerated particulate graphite material comprises a carbonized coating. Embodiment 62 is the process of any one of embodiments 46 to 61, wherein the purified agglomerated particulate graphite material comprises a purity in excess of 99.95 wt. % C. Embodiment 63 is the process of embodiment 47 or 48, further comprising recycling the quenched chlorine-containing gas back to the process. Embodiment 64 is the process of embodiment 49, further comprising recycling the NaOH or KOH values back to the process. Embodiment 65 is the process of embodiment 64, wherein the NaOH or KOH solution is neutralized to produce a NaCl or KCl solution. Embodiment 66 is the process of any one of embodiments 63 to 65, wherein the recycling comprises the use of a chlor-alkali system.

Embodiment 67 is a process for purifying graphite, the process comprising: reacting a particulate graphite feed in the presence of a chlorine-containing gas to produce a mixture comprising a purified particulate graphite material and a chlorine-containing gas laden with chlorinated impurities; and separating the purified particulate graphite material from the mixture. Embodiment 68 is the process of embodiment 67, further comprising leaching the particulate graphite feed using an alkaline leaching solution to produce a slurry; and subjecting the slurry to a separation step, wherein the leaching is preformed prior to reacting with the chlorine-containing gas. Embodiment 69 is the process of embodiment 67 or 68, further comprising agglomerating the particulate graphite feed using mechanical means. Embodiment 70 is the process of any one of embodiment 67 to 69, wherein the chlorine-containing gas laden with chlorinated impurities is quenched to remove the impurities. Embodiment 71 is the process of embodiment 70, wherein the chlorinated impurities comprise metal chlorides. Embodiment 72 is the process of embodiment 68, wherein the leaching is performed using an aqueous NaOH solution or an aqueous KOH solution. Embodiment 73 is the process of embodiment 72, wherein the aqueous NaOH solution comprises from about 10 wt. % to about 50 wt. % NaOH. Embodiment 74 is the process of embodiment 72 or 73, wherein the leaching is performed at a temperature ranging from about 50° C. to about 150° C. Embodiment 75 is the process of any one of embodiments 72 to 74, wherein the leaching is performed over a period ranging from about 15 minutes to about 16 hours. Embodiment 76 is the process of embodiment 69, wherein the mechanical means comprises mechanical briquetting. Embodiment 77 is the process of any one of embodiments 67 to 76, wherein the reaction with the chlorine-containing gas is performed at a temperature ranging from about 800° C. to about 1800° C. Embodiment 78 is the process of any one of embodiments 67 to 77, wherein the reaction with the chlorine-containing gas is performed over a period ranging from about 10 minutes to about 8 hours. Embodiment 79 is the process of any one of embodiments 67 to 78, wherein the particulate graphite feed is at least one of synthetic graphite, mined natural flake graphite (NFG) or graphite recovered from spent LiBs. Embodiment 80 is the process of any one of embodiments 67 to 79, further comprising milling the purified particulate graphite material to a particle size ranging from about 5 to about 30 microns. Embodiment 81 is the process of any one of embodiments 67 to 80, wherein the purified particulate graphite material comprises a purity in excess of 99.95 wt. % C. Embodiment 82 is the process of embodiment 70, further comprising recycling the quenched chlorine-containing gas back to the process. Embodiment 83 is the process of embodiment 72, further comprising recycling the NaOH or KOH values back to the process. Embodiment 84 is the process of embodiment 83, wherein the NaOH or KOH solution is neutralized to produce a NaCl or KCl solution. Embodiment 85 is the process of any one of embodiments 82 to 84, wherein the recycling comprises the use of a chlor-alkali system. Embodiment 86 is the process of any one of embodiments 67 to 85, further comprising carbon coating the purified particulate graphite material.

Embodiment 87 is a process for purifying graphite, the process comprising: agglomerating a particulate graphite feed using mechanical means producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture. Embodiment 88 is the process of embodiment 87, further comprising leaching the particulate graphite feed using an alkaline leaching solution to produce a slurry; and subjecting the slurry to a separation step, wherein the leaching is performed prior to agglomerating step. Embodiment 89 is the process of embodiment 87 or 88, wherein the chlorine-containing gas laden with chlorinated impurities is quenched to remove the impurities. Embodiment 90 is the process of embodiment 89, wherein the chlorinated impurities comprise metal chlorides. Embodiment 91 is the process of embodiment 88, wherein the leaching is performed using an aqueous NaOH solution or an aqueous KOH solution. Embodiment 92 is the process of embodiment 91, wherein the aqueous NaOH solution comprises from about 10 wt. % to about 50 wt. % NaOH. Embodiment 93 is the process of embodiment 88, 91 or 92, wherein the leaching is performed at a temperature ranging from about 50° C. to about 150° C. Embodiment 94 is the process of embodiment 88, 91, 92 or 93, wherein the leaching is performed over a period ranging from about 15 minutes to about 16 hours. Embodiment 95 is the process of any one of embodiments 87 to 94, wherein the mechanical means comprises mechanical briquetting. Embodiment 96 is the process of any one of embodiments 87 to 95, wherein the reaction with the chlorine-containing gas is performed at a temperature ranging from about 800° C. to about 1800° C. Embodiment 97 is the process of any one of embodiments 87 to 96, wherein the reaction with the chlorine-containing gas is performed over a period ranging from about 10 minutes to about 8 hours. Embodiment 98 is the process of any one of embodiments 87 to 97, wherein the particulate graphite feed is at least one of synthetic graphite, mined natural flake graphite (NFG) or graphite recovered from spent LiBs. Embodiment 99 is the process of any one of embodiments 87 to 98, further comprising milling the purified agglomerated particulate graphite material to a particle size ranging from about 5 to about 30 microns. Embodiment 100 is the process of any one of embodiments 87 to 99, wherein the purified agglomerated particulate graphite material comprises a purity in excess of 99.95 wt. % C. Embodiment 101 is the process of embodiment 89 or 90, further comprising recycling the quenched chlorine-containing gas back to the process. Embodiment 102 is the process of embodiment 91, further comprising recycling the NaOH or KOH values back to the process. Embodiment 103 is the process of embodiment 102, wherein the NaOH or KOH solution is neutralized to produce a NaCl or KCl solution. Embodiment 104 is the process of any one of embodiments 101 to 103, wherein the recycling comprises the use of a chlor-alkali system. Embodiment 105 is the process of any one of embodiments 87 to 104, further comprising carbon coating the purified particulate graphite material.

Embodiment 106 is a process for purifying graphite, the process comprising: leaching a particulate graphite feed using an alkaline leaching solution to produce a leached graphite feed material; agglomerating the leached graphite feed using mechanical means producing an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; and separating the purified agglomerated particulate graphite material from the mixture. Embodiment 107 is the process of embodiment 106, wherein the chlorine-containing gas laden with chlorinated impurities is quenched to remove the impurities. Embodiment 108 is the process of embodiment 107, wherein the chlorinated impurities comprise metal chlorides. Embodiment 109 is the process of any one of embodiments 106 to 108, wherein the leaching is performed using an aqueous NaOH solution or an aqueous KOH solution. Embodiment 110 is the process of embodiment 109, wherein the aqueous NaOH solution comprises from about 10 wt. % to about 50 wt. % NaOH. Embodiment 111 is the process of any one of embodiments 106 to 110, wherein the leaching is performed at a temperature ranging from about 50° C. to about 150° C. Embodiment 112 is the process of any one of embodiments 106 to 111, wherein the leaching is performed over a period ranging from about 15 minutes to about 16 hours. Embodiment 113 is the process of any one of embodiments 106 to 112, wherein the reaction with the chlorine-containing gas is performed at a temperature ranging from about 800° C. to about 1800° C. Embodiment 114 is the process of any one of embodiments 106 to 113, wherein the reaction with the chlorine-containing gas is performed over a period ranging from about 10 minutes to about 8 hours. Embodiment 115 is the process of any one of embodiments 106 to 114, wherein the particulate graphite feed is at least one of synthetic graphite, mined natural flake graphite (NFG) or graphite recovered from spent LiBs. Embodiment 116 is the process of any one of embodiments 106 to 115, further comprising milling the purified agglomerated particulate graphite material to a particle size ranging from about 5 to about 30 microns. Embodiment 117 is the process of any one of embodiments 106 to 116, wherein the purified agglomerated particulate graphite material comprises a purity in excess of 99.95 wt. % C. Embodiment 118 is the process of embodiment 107 or 108, further comprising recycling the quenched chlorine-containing gas back to the process. Embodiment 119 is the process of embodiment 109, further comprising recycling the NaOH or KOH values back to the process. Embodiment 120 is the process of embodiment 119, wherein the NaOH or KOH solution is neutralized to produce a NaCl or KCl solution. Embodiment 121 is the process of any one of embodiments 118 to 120, wherein the recycling comprises the use of a chlor-alkali system. Embodiment 122 is the process of any one of embodiments 106 to 121, further comprising carbon coating the purified particulate graphite material. Embodiment 123 is the process of any one of embodiments 106 to 122, wherein the mechanical means comprises mechanical briquetting.

Embodiment 124 is a particulate graphite material comprising a purity in excess of 99.95 wt. % C. Embodiment 125 is the particulate graphite material of embodiment 124, comprising a coated surface. Embodiment 126 is the particulate graphite material of embodiment 125, wherein the coating is a carbonized coating. Embodiment 127 is the particulate graphite material of embodiment 126, wherein the carbonized coating is produced from a binder material. Embodiment 128 is the particulate graphite material of embodiment 127, wherein the binder material is at least one of a carbonaceous binding agent or an organic resinous material. Embodiment 129 is the particulate graphite material of embodiment 128, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 130 is the particulate graphite material of embodiment 128, wherein the organic resinous material is at least one of petroleum or coal tar pitch. Embodiment 131 is the particulate graphite material of any one of embodiments 124 to 130, comprising a particle size ranging from about 5 to about 30 microns. Embodiment 132 is the particulate graphite material of any one of embodiments 124 to 131, wherein the graphite material is sourced from at least one of synthetic graphite, or mined natural flake graphite (NFG). Embodiment 133 is the particulate graphite material of any one of embodiments 124 to 132, obtained or obtainable by the process of any one of embodiments 1 to 66. Embodiment 134 is the particulate graphite material of embodiment 124, obtained or obtainable by the process of any one of embodiments 67 to 123. Embodiment 135 is the particulate graphite material of any one of embodiments 124 to 134, wherein the material comprises a spheronized material.

Embodiment 136 is an anode material for lithium-ion batteries (LiBs) comprising a particulate graphite material of purity in excess of 99.95 wt. % C. Embodiment 137 is the anode material of embodiment 136, wherein the particulate graphite material comprises a carbonized coating material. Embodiment 138 is the anode material of embodiment 137, wherein the carbonized coating is produced from a binder material. Embodiment 139 is the anode material of embodiment 138, wherein the binder material is at least one of a carbonaceous binding agent or an organic resinous material. Embodiment 140 is the anode material of embodiment 139, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 141 is the anode material of embodiment 139, wherein the organic resinous material is at least one of petroleum or coal tar pitch. Embodiment 142 is the anode material of any one of embodiments 136 to 141, comprising a particle size ranging from about 5 to about 30 microns. Embodiment 143 is the anode material of any one of embodiments 136 to 142, wherein the graphite material is sourced from at least one of synthetic graphite, or mined natural flake graphite (NFG). Embodiment 144 is the anode material of any one of embodiments 136 to 143, obtained or obtainable by the process of any one of embodiments 1 to 66.

Embodiment 145 is a graphite particle for lithium-ion batteries (LiBs), wherein the graphite particle has a purity in excess of 99.95 wt. % C and wherein a calcined binder material connects to at least a part of the graphite particle's surface. Embodiment 146 is the graphite particle of embodiment 145, wherein the binder material is at least one of a carbonaceous binding agent or an organic resinous material. Embodiment 147 is the graphite particle of embodiment 146, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA). Embodiment 148 is the graphite particle of embodiment 146, wherein the organic resinous material is at least one of petroleum or coal tar pitch. Embodiment 148 is the graphite particle of any one of embodiments 145 to 148, comprising a particle size ranging from about 5 to about 30 microns. Embodiment 150 is the graphite particle of any one of embodiments 145 to 149, wherein the graphite is sourced from at least one of synthetic graphite, or mined natural flake graphite (NFG). Embodiment 151 is the graphite particle of any one of embodiments 145 to 150, obtained or obtainable by the process of any one of embodiments 1 to 66.

Embodiment 152 is an electrode or electrochemical storage device comprising the particulate graphite material of any one of embodiments 124 to 132.

Embodiment 153 is an electrode or electrochemical storage device comprising the anode material of any one of embodiments 136 to 143.

Embodiment 154 is an electrode or electrochemical storage device comprising the graphite particle of any one of embodiments 145 to 150. Embodiment 155 is the electrode or electrochemical storage device of any one of embodiments 152 to 154, wherein the electrochemical storage device comprises lithium-ion batteries (LiBs).

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

As used in this specification and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

The foregoing and other advantages and features of the present disclosure will become more apparent upon reading of the following non-restrictive detailed description of illustrative embodiments thereof, with reference to the accompanying drawings/figures. It should be understood, however, that the detailed description and the illustrative embodiments, while indicating specific embodiments of the disclosure, are given by way of illustration only, since various changes and modifications within the spirit and scope of the disclosure will become apparent to those skilled in the art from this description.

BRIEF DESCRIPTION OF THE DRAWINGS/FIGURES

The following figures/drawings form part of the present specification and are included to further demonstrate certain aspects of the present specification. The present specification may be better understood by reference to one or more of these figures/drawings in combination with the detailed description. In the appended drawings/figures:

FIG. 1—Illustration of a flowchart illustrating the process for purifying and producing a high purity particulate graphite material from a graphite feed material, in accordance with an embodiment of the present disclosure.

Figure 2:
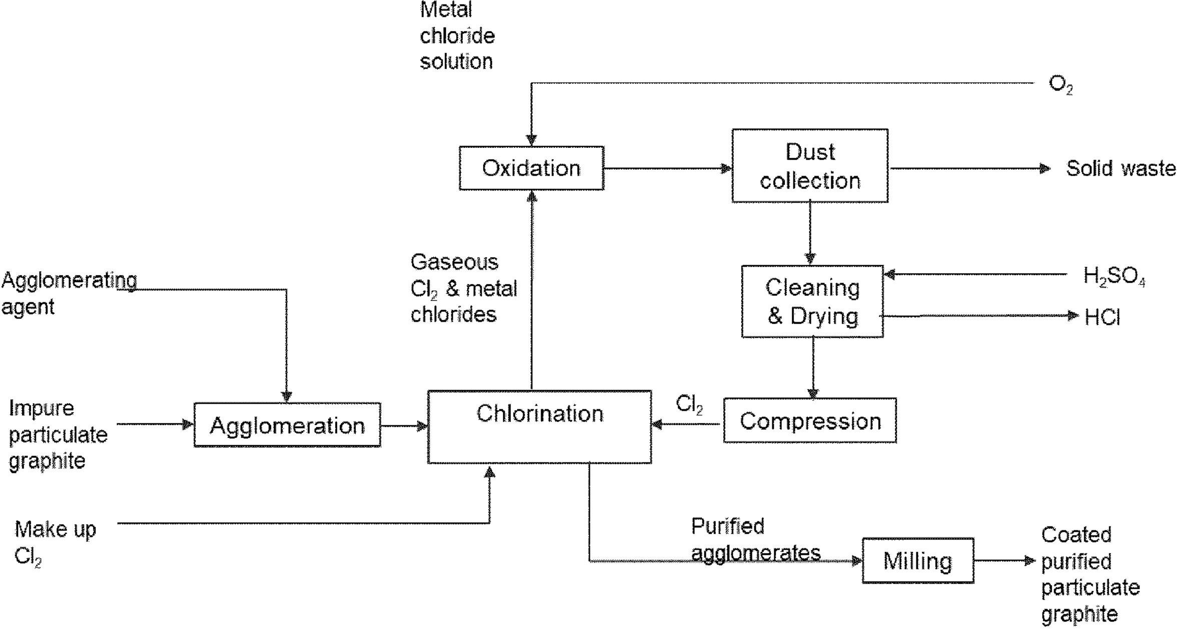

FIG. 2—Illustration of a flowchart illustrating the process for purifying and producing a high purity particulate graphite material from a graphite feed material, in accordance with an embodiment of the present disclosure.

Figure 3:
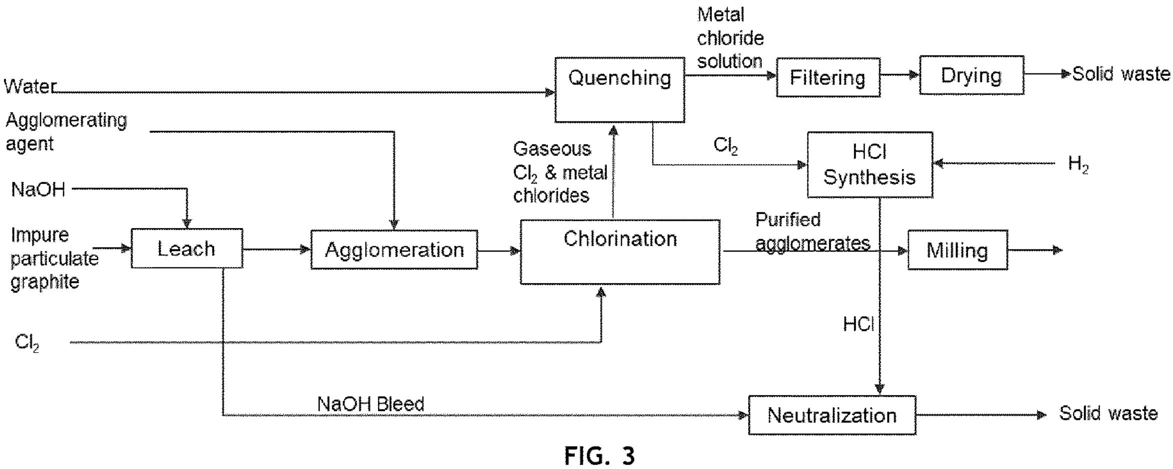

FIG. 3—Illustration of a flowchart illustrating the process for purifying and producing a high purity particulate graphite material from a graphite feed material, in accordance with an embodiment of the present disclosure.

Figure 4:
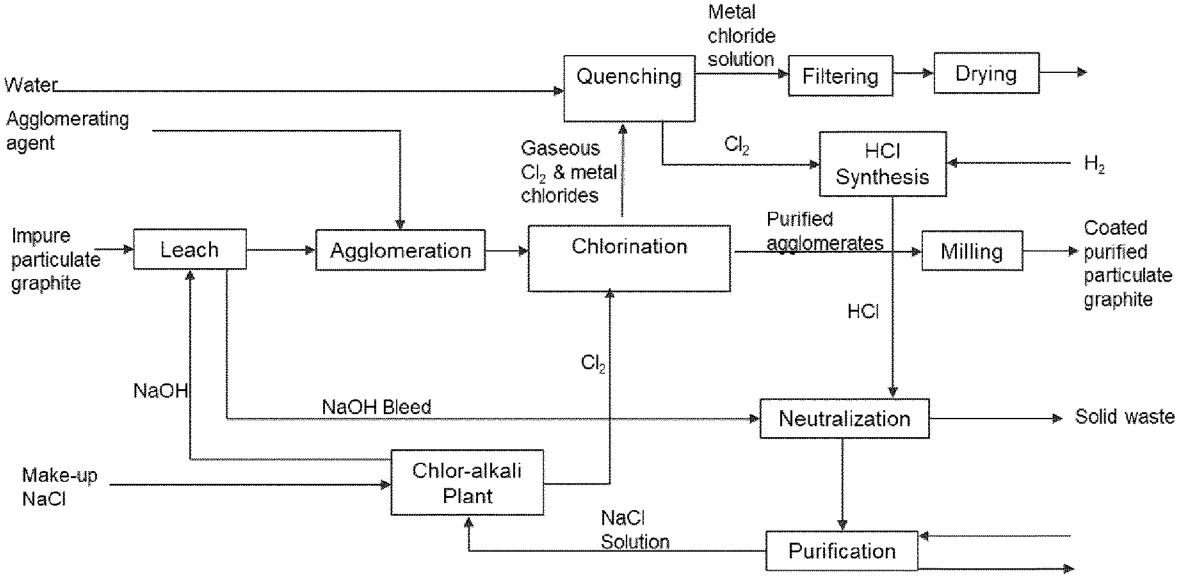

FIG. 4—Illustration of a flowchart illustrating the process for purifying and producing a high purity particulate graphite material from a graphite feed material, in accordance with an embodiment of the present disclosure.

Figure 5:
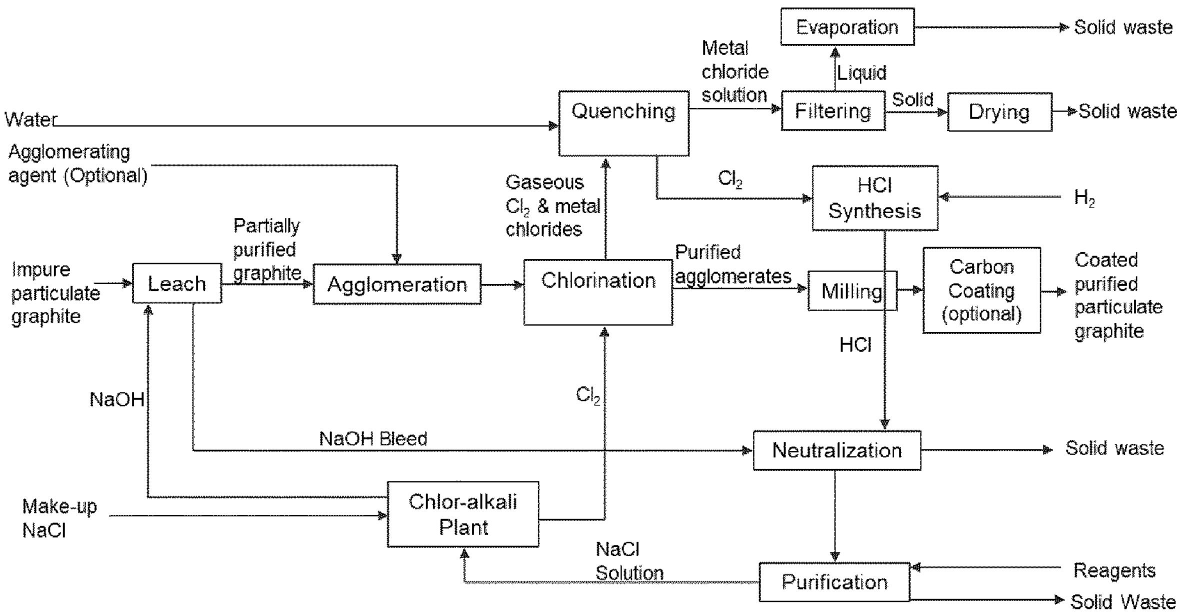

FIG. 5—Illustration of a flowchart illustrating the process for purifying and producing a high purity particulate graphite material from a graphite feed material, in accordance with an embodiment of the present disclosure.

DETAILED DESCRIPTION OF ILLUSTRATIVE EMBODIMENTS

The present disclosure relates to a process for purifying and producing high purity graphite particles suitable for use in batteries. The present disclosure also relates to a process for purifying and producing coated high purity graphite particles suitable for use in batteries. In an aspect of the present disclosure, the coating comprises a carbon coating. The present disclosure also relates to high purity particulate graphite particles, and their use as anode material in rechargeable lithium-ion batteries (LiBs). The present disclosure also relates to coated high purity particulate graphite particles, and their use as anode material in rechargeable lithium-ion batteries (LiBs). In an aspect of the present disclosure, the coating comprises a carbon coating. In an aspect of the present disclosure, the high purity graphite particles exhibit a purity in excess of 99.95 wt. % C. These and other aspects of the disclosure are described in greater detail below.

With reference to FIG. 1, illustrated therein are selected steps of the process for purifying and producing a high purity coated particulate graphite material from a graphite feed material, in accordance with an embodiment of the present disclosure. The process comprises treating an impure graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; separating the purified agglomerated particulate graphite material from the gaseous mixture; quenching the gaseous mixture to condense and separate the impurities from the chlorine gas as a metal chloride solution; reacting the chlorine gas with hydrogen to form hydrochloric acid; and milling the agglomerates to obtain a coated purified particulate graphite material. In an aspect of the present disclosure, the coating comprises a carbon coating.

With reference to FIG. 2, illustrated therein are selected steps of the process for purifying and producing a high purity coated particulate graphite material from a graphite feed material, in accordance with an embodiment of the present disclosure. The process comprises treating an impure graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; oxidizing the chlorinated impurities using oxygen (as practiced in the production of titanium oxide in the pigment industry) to produce solid particulate oxides; separating the solid oxides from the chlorine gas; cleaning, drying and compression of the chlorine gas ahead of recycling back to the chlorination reactor; and milling the agglomerates to obtain a coated purified particulate graphite material. In an aspect of the present disclosure, the coating comprises a carbon coating.

With reference to FIG. 3, illustrated therein are selected steps of the process for purifying and producing a high purity coated particulate graphite material from a graphite feed material, in accordance with an embodiment of the present disclosure. The process comprises leaching an impure particulate graphite feed using an alkaline leaching solution to produce a partially purified leached particulate graphite feed material; treating the partially purified leached particulate graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; separating the purified agglomerated particulate graphite material from the gaseous mixture; quenching the gaseous mixture to condense and separate the impurities from the chlorine gas as a metal chloride solution; reacting the chlorine gas with hydrogen to form hydrochloric acid; and milling the agglomerates to obtain a coated purified particulate graphite material. In an aspect of the present disclosure, the coating comprises a carbon coating.

With reference to FIG. 4, illustrated therein are selected steps of the process for purifying and producing a high purity coated particulate graphite material from a graphite feed material, in accordance with an embodiment of the present disclosure. The process comprises leaching an impure particulate graphite feed using an alkaline leaching solution to produce a partially purified leached particulate graphite feed material; treating the partially purified leached particulate graphite feed with an agglomerating agent to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; separating the purified agglomerated particulate graphite material from the gaseous mixture; quenching the gaseous mixture to condense and separate the impurities from the chlorine gas as a metal chloride solution; reacting the chlorine gas with hydrogen to form hydrochloric acid; neutralizing the hydrochloric acid with spent alkaline leaching solution to produce an alkaline metal salt solution; purifying the alkaline metal salt solution using precipitation reagents; generating alkaline leaching solution and chlorine using an industry standard chlor-alkali process; and milling the agglomerates to obtain a coated purified particulate graphite material. In an aspect of the present disclosure, the coating comprises a carbon coating.

With reference to FIG. 5, illustrated therein are selected steps of the process for purifying and producing a high purity coated particulate graphite material from a graphite feed material, in accordance with an embodiment of the present disclosure. The process comprises leaching an impure particulate graphite feed using an alkaline leaching solution to produce a partially purified leached particulate graphite feed material; agglomerating the partially purified leached particulate graphite feed using mechanical briquetting, with or without an agglomerating agent, to produce an agglomerated particulate graphite feed; reacting the agglomerated particulate graphite feed in the presence of a chlorine-containing gas to produce a mixture comprising a purified agglomerated particulate graphite material and a chlorine-containing gas laden with chlorinated impurities; separating the purified agglomerated particulate graphite material from the gaseous mixture; quenching the gaseous mixture to condense and separate the impurities from the chlorine gas as a metal chloride solution; reacting the chlorine gas with hydrogen to form hydrochloric acid; neutralizing the hydrochloric acid with spent alkaline leaching solution to produce an alkaline metal salt solution; purifying the alkaline metal salt solution using precipitation reagents; generating alkaline leaching solution and chlorine using an industry standard chlor-alkali process; and milling the agglomerates to obtain a purified particulate graphite material. In an aspect of the present disclosure, when mechanical briquetting is performed in the absence of an agglomerating agent the purified particulate graphite material is uncoated. In an aspect of the present disclosure, when mechanical briquetting is performed in the presence of an agglomerating agent the purified particulate graphite material is coated. In a further aspect of the present disclosure, the coating comprises a carbon coating.

Even though the process and process steps described herein are designed to produce a high purity particulate graphite material for use in lithium-ion batteries (LiBs), it is to be understood that the process and process steps can also be used to purify any carbonaceous material, non-limiting examples of which include synthetic graphite and amorphous carbon. In an embodiment of the present disclosure, such carbonaceous material is graphite recovered from spent LiBs.

In an embodiment of the present disclosure, the graphite feed material consists of natural flake graphite (NFG). The impurities contained in NFG typically fall into two broad groups: species (e.g., silicates) that will more readily react under alkaline conditions, such as by treatment with an aqueous NaOH or KOH solution; and species (e.g., metal oxides) that will more readily react with chlorine gas to form volatile chlorides. The process for producing a high purity particulate graphite material can thus be tailored in function of the impurity composition of the graphite feed material. In embodiments wherein the graphite feed material comprises both silicate and metal oxide impurities, the process may advantageously comprise both a leaching step and a chlorination step. In embodiments wherein the graphite feed material comprises substantially metal oxide impurities, the leaching step may be omitted and the graphite feed material is submitted to the chlorination step only, as illustrated in FIGS. 1 and 2.

In an aspect of the present disclosure, the graphite feed material may be subjected to a leaching step using an alkaline leaching solution, as illustrated in FIGS. 3 and 4. In an embodiment of the present disclosure, the alkaline leaching solution comprises an aqueous NaOH solution or an aqueous KOH solution. The alkaline leaching dissolves and removes some of the impurities present in the graphite feed material, non-limiting examples of which include silicates, into the leach liquor. The leach liquor may subsequently be separated from the leached graphite feed material via decantation and/or filtration, and neutralized, providing a partially purified particulate graphite feed material. In embodiments, the precipitate may be further subjected to one or more washes (e.g., with water). In embodiments, the leach liquor may be neutralized using hydrochloric acid. The neutralization results in the formation (e.g., precipitation) of a solid residue that is substantially composed of impurities that were contained in the original graphite feed material (e.g., silicates). The solid residue may subsequently be separated from the neutralized liquor via decantation and/or filtration. In embodiments, the solid residue is disposed. In an aspect of the present disclosure, the neutralized liquor, comprising predominantly sodium chloride (NaCl), or potassium chloride (KCl) may be purified using precipitation techniques standard to the chlor-alkali process industry, and recycled as feed to a chlor-alkali system for further generation of an NaOH or KOH solution and $Cl_2$ gas.

In embodiments of the present disclosure, the alkaline leaching solution comprises from about 10 wt. % to about 50 wt. % NaOH; in a further embodiment from about 15 wt. % to about 45 wt. % NaOH; in a further embodiment from about 20 wt. % to about 40 wt. % NaOH; in a further embodiment from about 25 wt. % to about 35 wt. % NaOH; in a further embodiment from about 10 wt. % to about 45 wt. % NaOH; in a further embodiment from about 10 wt. % to about 40 wt. % NaOH; in a further embodiment from about 10 wt. % to about 35 wt. % NaOH; in a further embodiment from about 10 wt. % to about 30 wt. % NaOH; in a further embodiment from about 10 wt. % to about 25 wt. % NaOH; in a further embodiment from about 10 wt. % to about 20 wt. % NaOH; in a further embodiment from about 10 wt. % to about 15 wt. % NaOH; in a further embodiment from about 15 wt. % to about 50 wt. % NaOH; in a further embodiment from about 20 wt. % to about 50 wt. % NaOH; in a further embodiment from about 25 wt. % to about 50 wt. % NaOH; in a further embodiment from about 30 wt. % to about 50 wt. % NaOH; in a further embodiment from about 35 wt. % to about 50 wt. % NaOH; in a further embodiment from about 40 wt. % to about 50 wt. % NaOH; about 10 wt. % NaOH; about 11 wt. % NaOH; about 12 wt. % NaOH; about 13 wt. % NaOH; about 14 wt. % NaOH; about 15 wt. % NaOH; about 16 wt. % NaOH; about 17 wt. % NaOH; about 18 wt. % NaOH; about 19 wt. % NaOH; about 20 wt. % NaOH; about 21 wt. % NaOH; about 22 wt. % NaOH; about 23 wt. % NaOH; about 24 wt. % NaOH; about 25 wt. % NaOH; about 26 wt. % NaOH; about 27 wt. % NaOH; about 28 wt. % NaOH; about 29 wt. % NaOH; about 30 wt. % NaOH; about 31 wt. % NaOH; about 32 wt. % NaOH; about 33 wt. % NaOH; about 34 wt. % NaOH; about 35 wt. % NaOH; about 36 wt. % NaOH; about 37 wt. % NaOH; about 38 wt. % NaOH; about 39 wt. % NaOH; about 40 wt. % NaOH; about 41 wt. % NaOH; about 42 wt. % NaOH; about 43 wt. % NaOH; about 44 wt. % NaOH; about 45 wt. % NaOH; about 46 wt. % NaOH; about 47 wt. % NaOH; about 48 wt. % NaOH; about 49 wt. % NaOH; or about 50 wt. % NaOH.

In embodiments of the present disclosure, the alkaline leaching solution comprises from about 10 wt. % to about 50 wt. % KOH; in a further embodiment from about 15 wt. % to about 45 wt. % KOH; in a further embodiment from about 20 wt. % to about 40 wt. % KOH; in a further embodiment from about 25 wt. % to about 35 wt. % KOH; in a further embodiment from about 10 wt. % to about 45 wt. % KOH; in a further embodiment from about 10 wt. % to about 40 wt. % KOH; in a further embodiment from about 10 wt. % to about 35 wt. % KOH; in a further embodiment from about 10 wt. % to about 30 wt. % KOH; in a further embodiment from about 10 wt. % to about 25 wt. % KOH; in a further embodiment from about 10 wt. % to about 20 wt. % KOH; in a further embodiment from about 10 wt. % to about 15 wt. % KOH; in a further embodiment from about 15 wt. % to about 50 wt. % KOH; in a further embodiment from about 20 wt. % to about 50 wt. % KOH; in a further embodiment from about 25 wt. % to about 50 wt. % KOH; in a further embodiment from about 30 wt. % to about 50 wt. % KOH; in a further embodiment from about 35 wt. % to about 50 wt. % KOH; in a further embodiment from about 40 wt. % to about 50 wt. % KOH; about 10 wt. % KOH; about 11 wt. % KOH; about 12 wt. % KOH; about 13 wt. % KOH; about 14 wt. % KOH; about 15 wt. % KOH; about 16 wt. % KOH; about 17 wt. % KOH; about 18 wt. % KOH; about 19 wt. % KOH; about 20 wt. % KOH; about 21 wt. % KOH; about 22 wt. % KOH; about 23 wt. % KOH; about 24 wt. % KOH; about 25 wt. % KOH; about 26 wt. % KOH; about 27 wt. % KOH; about 28 wt. % KOH; about 29 wt. % KOH; about 30 wt. % KOH; about 31 wt. % KOH; about 32 wt. % KOH; about 33 wt. % KOH; about 34 wt. % KOH; about 35 wt. % KOH; about 36 wt. % KOH; about 37 wt. % KOH; about 38 wt. % KOH; about 39 wt. % KOH; about 40 wt. % KOH; about 41 wt. % KOH; about 42 wt. % KOH; about 43 wt. % KOH; about 44 wt. % KOH; about 45 wt. % KOH; about 46 wt. % KOH; about 47 wt. % KOH; about 48 wt. % KOH; about 49 wt. % KOH; or about 50 wt. % KOH.

In embodiments of the present disclosure, the alkaline leaching may be performed at a temperature ranging from about 50° C. to about 150° C.; in a further embodiment from about 55° C. to about 145° C.; in a further embodiment from about 60° C. to about 140° C.; in a further embodiment from about 65° C. to about 135° C.; in a further embodiment from about 70° C. to about 130° C.; in a further embodiment from about 75° C. to about 125° C.; in a further embodiment from about 80° C. to about 120° C.; in a further embodiment from about 85° C. to about 115° C.; in a further embodiment from about 90° C. to about 110° C.; in a further embodiment from about 95° C. to about 105° C.; in a further embodiment from about 55° C. to about 150° C.; in a further embodiment from about 60° C. to about 150° C.; in a further embodiment from about 65° C. to about 150° C.; in a further embodiment from about 70° C. to about 150° C.; in a further embodiment from about 75° C. to about 150° C.; in a further embodiment from about 80° C. to about 150° C.; in a further embodiment from about 85° C. to about 150° C.; in a further embodiment from about 90° C. to about 150° C.; in a further embodiment from about 95° C. to about 150° C.; in a further embodiment from about 100° C. to about 150° C.; in a further embodiment from about 105° C. to about 150° C.; in a further embodiment from about 110° C. to about 150° C.; in a further embodiment from about 115° C. to about 150° C.; in a further embodiment from about 120° C. to about 150° C.; in a further embodiment from about 125° C. to about 150° C.; in a further embodiment from about 130° C. to about 150° C.; in a further embodiment from about 135° C. to about 150° C.; in a further embodiment from about 140° C. to about 150° C.; in a further embodiment from about 145° C. to about 150° C.; about 50° C.; about 55° C.; about 60° C.; about 65° C.; about 70° C.; about 75° C.; about 80° C.; about 85° C.; about 90° C.; about 95° C.; about 100° C.; about 105° C.; about 110° C.; about 115° C.; about 120° C.; about 125° C.; about 130° C.; about 135° C.; about 140° C.; about 145° C.; or about 150° C.

In embodiments of the present disclosure, the alkaline leaching may be performed over a period of time ranging from about 15 minutes to about 16 hours; in a further embodiment from about 30 minutes to about 16 hours; in a further embodiment from about 45 minutes to about 16 hours; in a further embodiment from about 1 hour to about 16 hours; in a further embodiment from about 1.5 hours to about 16 hours; in a further embodiment from about 2 hours to about 16 hours; in a further embodiment from about 2.5 hours to about 16 hours; in a further embodiment from about 3 hours to about 16 hours; in a further embodiment from about 3.5 hours to about 16 hours; in a further embodiment from about 4 hours to about 16 hours; in a further embodiment from about 4.5 hours to about 16 hours; in a further embodiment from about 5 hours to about 16 hours; in a further embodiment from about 5.5 hours to about 16 hours; in a further embodiment from about 6 hours to about 16 hours; in a further embodiment from about 6.5 hours to about 16 hours; in a further embodiment from about 7 hours to about 16 hours; in a further embodiment from about 7.5 hours to about 16 hours; in a further embodiment from about 8 hours to about 16 hours; in a further embodiment from about 8.5 hours to about 16 hours; in a further embodiment from about 9 hours to about 16 hours; in a further embodiment from about 9.5 hours to about 16 hours; in a further embodiment from about 10 hours to about 16 hours; in a further embodiment from about 10.5 hours to about 16 hours; in a further embodiment from about 11 hours to about 16 hours; in a further embodiment from about 11.5 hours to about 16 hours; in a further embodiment from about 12 hours to about 16 hours; in a further embodiment from about 12.5 hours to about 16 hours; in a further embodiment from about 13 hours to about 16 hours; in a further embodiment from about 13.5 hours to about 16 hours; in a further embodiment from about 14 hours to about 16 hours; in a further embodiment from about 14.5 hours to about 16 hours; in a further embodiment from about 15 hours to about 16 hours; in a further embodiment from about 15 minutes to about 15.5 hours; in a further embodiment from about 15 minutes to about 14 hours; in a further embodiment from about 15 minutes to about 13.5 hours; in a further embodiment from about 15 minutes to about 13 hours; in a further embodiment from about 15 minutes to about 12.5 hours; in a further embodiment from about 15 minutes to about 12 hours; in a further embodiment from about 15 minutes to about 11.5 hours; in a further embodiment from about 15 minutes to about 11 hours; in a further embodiment from about 15 minutes to about 10.5 hours; in a further embodiment from about 15 minutes to about 10 hours; in a further embodiment from about 15 minutes to about 9.5 hours; in a further embodiment from about 15 minutes to about 9 hours; in a further embodiment from about 15 minutes to about 8.5 hours; in a further embodiment from about 15 minutes to about 8 hours; in a further embodiment from about 15 minutes to about 7.5 hours; in a further embodiment from about 15 minutes to about 7 hours; in a further embodiment from about 15 minutes to about 6.5 hours; in a further embodiment from about 15 minutes to about 6 hours; in a further embodiment from about 15 minutes to about 5.5 hours; in a further embodiment from about 15 minutes to about 5 hours; in a further embodiment from about 15 minutes to about 4.5 hours; in a further embodiment from about 15 minutes to about 4 hours; in a further embodiment from about 15 minutes to about 3.5 hours; in a further embodiment from about 15 minutes to about 3 hours; in a further embodiment from about 15 minutes to about 2.5 hours; in a further embodiment from about 15 minutes to about 2 hours; in a further embodiment from about 15 minutes to about 1.5 hours; in a further embodiment from about 15 minutes to about 1 hour; in a further embodiment from about 15 minutes to about 45 minutes; in a further embodiment from about 15 minutes to about 30 minutes; about 15 minutes, about 30 minutes; about 45 minutes; about 1 hour; about 1.5 hours, about 2 hours; about 2.5 hours, about 3 hours; about 3.5 hours, about 4 hours; about 4.5 hours, about 5 hours; about 5.5 hours, about 6 hours; about 6.5 hours, about 7 hours; about 7.5 hours, about 8 hours; about 8.5 hours, about 9 hours; about 9.5 hours, about 10 hours; about 10.5 hours, about 11 hours; about 11.5 hours, about 12 hours; about 12.5 hours, about 13 hours; about 13.5 hours, about 14 hours; about 14.5 hours, about 15 hours; about 15.5 hours, or about 16 hours.

In an aspect of the present disclosure, the partially purified leached particulate graphite feed may be subjected to a chlorination step using chlorine-containing gas. In an embodiment of the present disclosure, the chlorination step advantageously removes additional impurities from the partially purified graphite feed material in the form of chlorinated impurities, non-limiting examples of which include metal chlorides. The metal chlorides comprise volatile metal chlorides such as $FeCl_3$. The chlorinated impurities (e.g., metal chlorides) are subsequently removed from the graphite material by the flowing $Cl_2$ gas. In an embodiment of the present disclosure, the chlorine-containing gas, laden with chlorinated impurities, may be quenched in water and the chlorinated impurities are separated from the $Cl_2$ gas by means of filtration and/or evaporation of the aqueous quench solution. The quenching can be performed using a contacting device such as a wet scrubber. In an embodiment of the present disclosure, the $Cl_2$ gas, free of the chlorinated impurities, may subsequently be burnt using hydrogen gas ($H_2$) to form an aqueous hydrochloric acid solution, which may be used to neutralize the leach liquor from the leaching step. The chlorination step may be conducted using a standard pyrometallurgical reactor, including but not limited to a shaft furnace, rotary kiln, Acheson furnace, or fluid bed reactor. The purified graphite material exiting the chlorination reactor is cooled and, if in agglomerated form, is lightly milled to reconstitute a particulate material of appropriate particle size.

In embodiments of the present disclosure, the chlorination step may performed at a temperature ranging from about 800° C. to about 1800° C.; in a further embodiment from about 850° C. to about 1750° C.; in a further embodiment from about 900° C. to about 1700° C.; in a further embodiment from about 950° C. to about 1650° C.; in a further embodiment from about 1000° C. to about 1600° C.; in a further embodiment from about 1050° C. to about 1550° C.; in a further embodiment from about 1100° C. to about 1500° C.; in a further embodiment from about 1150° C. to about 1450° C.; in a further embodiment from about 1200° C. to about 1400° C.; in a further embodiment from about 1250° C. to about 1350° C.; in a further embodiment from about 1275° C. to about 1325° C.; in a further embodiment from about 850° C. to about 1800° C.; in a further embodiment from about 900° C. to about 1800° C.; in a further embodiment from about 950° C. to about 1800° C.; in a further embodiment from about 1000° C. to about 1800° C.; in a further embodiment from about 1050° C. to about 1800° C.; in a further embodiment from about 1100° C. to about 1800° C.; in a further embodiment from about 1150° C. to about 1800° C.; in a further embodiment from about 1200° C. to about 1800° C.; in a further embodiment from about 1250° C. to about 1800° C.; in a further embodiment from about 1300° C. to about 1800° C.; in a further embodiment from about 1350° C. to about 1800° C.; in a further embodiment from about 1400° C. to about 1800° C.; in a further embodiment from about 1450° C. to about 1800° C.; in a further embodiment from about 1500° C. to about 1800° C.; in a further embodiment from about 1550° C. to about 1800° C.; in a further embodiment from about 1600° C. to about 1800° C.; in a further embodiment from about 1650° C. to about 1800° C.; in a further embodiment from about 1700° C. to about 1800° C.; in a further embodiment from about 1750° C. to about 1800° C.; about 800° C.; about 850° C.; about 900° C.; about 950° C.; about 1000° C.; about 1050° C.; about 1100° C.; about 1150° C.; about 1200° C.; about 1250° C.; about 1300° C.; about 1350° C.; about 1400° C.; about 1450° C.; about 1500° C.; about 1550° C.; about 1600° C.; about 1650° C.; about 1700° C.; about 1750° C.; or about 1800° C.

In embodiments of the present disclosure, the chlorination step may be performed over a period of time ranging from about 10 minutes to about 8 hours; in a further embodiment from about 20 minutes to about 8 hours; in a further embodiment from about 30 minutes to about 8 hours; in a further embodiment from about 40 minutes to about 8 hours; in a further embodiment from about 50 minutes to about 8 hours; in a further embodiment from about 1 hour to about 8 hours; in a further embodiment from about 1.5 hours to about 8 hours; in a further embodiment from about 2 hours to about 8 hours; in a further embodiment from about 2.5 hours to about 8 hours; in a further embodiment from about 3 hours to about 8 hours; in a further embodiment from about 3.5 hours to about 8 hours; in a further embodiment from about 4 hours to about 8 hours; in a further embodiment from about 4.5 hours to about 8 hours; in a further embodiment from about 5 hours to about 8 hours; in a further embodiment from about 5.5 hours to about 8 hours; in a further embodiment from about 6 hours to about 8 hours; in a further embodiment from about 6.5 hours to about 8 hours; in a further embodiment from about 7 hours to about 8 hours; in a further embodiment from about 7.5 hours to about 8 hours; in a further embodiment from about 10 minutes to about 7.5 hours; in a further embodiment from about 10 minutes to about 7 hours; in a further embodiment from about 10 minutes to about 6.5 hours; in a further embodiment from about 10 minutes to about 6 hours; in a further embodiment from about 10 minutes to about 5.5 hours; in a further embodiment from about 10 minutes to about 5 hours; in a further embodiment from about 10 minutes to about 4.5 hours; in a further embodiment from about 10 minutes to about 4 hours; in a further embodiment from about 10 minutes to about 3.5 hours; in a further embodiment from about 10 minutes to about 3 hours; in a further embodiment from about 10 minutes to about 2.5 hours; in a further embodiment from about 10 minutes to about 2 hours; in a further embodiment from about 10 minutes to about 1.5 hours; in a further embodiment from about 10 minutes to about 1 hour; in a further embodiment from about 10 minutes to about 50 minutes; in a further embodiment from about 10 minutes to about 40 minutes; in a further embodiment from about 10 minutes to about 30 minutes; in a further embodiment from about 10 minutes to about 20 minutes; about 10 minutes, about 20 minutes; about 30 minutes, about 40 minutes, about 50 minutes; about 1 hour; about 1.5 hours, about 2 hours; about 2.5 hours, about 3 hours; about 3.5 hours, about 4 hours; about 4.5 hours, about 5 hours; about 5.5 hours, about 6 hours; about 6.5 hours, about 7 hours; about 7.5 hours, or about 8 hours.

In an aspect of the present disclosure, the reaction conditions for the alkaline leaching step and/or chlorination step may be advantageously tailored based on the composition of the impurities in the graphite feed material. In embodiments of the present disclosure, graphite feed materials comprising higher ratios of silicate: metal oxides may be subjected to leaching conditions using higher concentrations of NaOH or KOH and optionally longer leaching times. In embodiments of the present disclosure, graphite feed materials comprising lower ratios of silicate: metal oxides may be subjected to leaching conditions using lower concentrations of NaOH or KOH and optionally shorter leaching times. In yet further embodiments of the present disclosure, the composition of the impurities in the graphite feed material may be such (e.g., a sufficiently low content of silicates) so that the alkaline leching step may be dispensed with and the graphite feed material is subjected to the chlorination step without any prior alkaline leaching. A person skilled in the art would understand that all processing conditions, for example with reference to the alkaline leaching and/or chlorination steps, such as processing time, processing temperature and/or concentration of alkaline material, can be varied to optimize the yield of the desired product and it is within their skill to do so.

In an aspect of the present disclosure, it may be possible to achieve the required purity for the particulate graphite material with only the chlorination step, as illustrated in FIGS. 1 and 2. In such embodiments, the alkaline leaching step may be dispensed with. The chlorine-containing gas, laden with chlorinated impurities, may subsequently be treated to remove the impurities. In an embodiment, the chlorine-containing gas, laden with chlorinated impurities, is quenched in water and the chlorinated impurities (e.g., metal chlorides) are separated from the $Cl_2$ gas by means of filtration and/or evaporation of the aqueous quench solution. The quenching may be performed using a contacting device such as a wet scrubber. The $Cl_2$ gas, free of the chlorinated impurities, may subsequently be burnt using hydrogen gas ($H_2$) to form an aqueous hydrochloric acid solution, which may be sold. In an embodiment, the chlorine-containing gas, laden with chlorinated impurities, may be reacted with oxygen ($O_2$) to convert the chlorinated impurities (e.g., metal chlorides) to solid metal oxides, as is practiced by the titanium dioxide pigment industry, which may subsequently be collected using standard dust collection equipment such as an electrostatic precipitator or bag filter.

In an aspect of the present disclosure, the chlorine gas ($Cl_2$) may be advantageously recycled back into the process for further treatment of graphite feed material. In an embodiment of the present disclosure, the chlorine gas, free of metal impurities, may be purified prior to being recycled back into the process (FIG. 2). In embodiments of the present disclosure, the purification comprises removing any $H_2$ and/or HCl that could be present in the chlorine gas following the removal of the chlorinated impurities. It is to be noted that any hydrogen present in the system is susceptible to reacting with the chlorine gas, resulting in the formation of HCl. The reaction between hydrogen and chlorine occurs readily at temperatures above 250° C. and is accelerated by the presence of moisture. In an embodiment of the present disclosure, any such HCl may be removed from the chlorine gas by condensation. Sulfuric acid ($H_2SO_4$) may then be used to dry the chlorine gas resulting in the removal of any residual $H_2$. The resulting purified chlorine gas is then compressed and recycled back into the process for further treatment of graphite feed material.

One of the technical challenges with the high temperature chlorination step is obtaining and maintaining an optimal temperature range at which the metal oxide impurities are effectively chlorinated, while also avoiding any excessive oxidation of the graphite feed material. In an aspect, the present disclosure relates to the chlorination of metal oxide impurities present in the graphite feed material using chlorine gas, while advantageously avoiding excessive oxidation of the graphite feed material.

In an embodiment of the present disclosure, the optimal temperature range may be obtained using indirect heating with either fuel (for example, natural gas or fuel oil) or electricity. In a further embodiment of the present disclosure, the optimal temperature and control of atmosphere may be obtained using a plasma torch. In this case, chlorine would provide both the gas for plasma ionization and purification via chlorination. In an aspect of the present disclosure, the plasma torch may be used in conjunction with a rotary kiln.

In a further embodiment of the present disclosure, the optimal temperature range may be obtained by adding a controlled level of oxygen to the chlorine gas, resulting in the oxidation of a small amount of the graphite feed material and the generation of heat energy sufficient to maintain the required temperature range providing for the efficient chlorination of the metal oxide impurities. In an embodiment of the present disclosure, a $Cl_2/O_2$ gas mixture comprising 95 wt. % $Cl_2$ and 5 wt. % 02 may be used for process temperatures of about 1100° C. A person skilled in the art would understand that the balance of the $Cl_2/O_2$ gas mixture is temperature dependent and can be varied to optimize the yield of the desired product, and it is within their skill to do so. Higher process temperatures will typically imply a higher $O_2$ content. In an embodiment, the chlorination step may be performed at a temperature ranging from about 800° C. to about 1800° C.

In an aspect of the present disclosure, the particulate graphite feed material is natural flake graphite. In an embodiment of the present disclosure, the natural flake graphite feed material is a flotation concentrate with a particle size from about 45 microns to about 800 microns. In a further embodiment of the present disclosure, the natural flake graphite feed material is a flotation concentrate that has been reduced in size ("micronized") to between about 5 microns and about 30 microns, or to between about 10 microns and about 30 microns. In a still further embodiment of the present disclosure, the natural flake graphite feed material is a flotation concentrate that has been reduced in size ("micronized") to between about 5 microns and about 30 microns, or to between about 10 microns and about 30 microns, and shape modified (spheronized).

The processing of very fine particulates (e.g., ≤200 microns) through standard pyrometallurgical reactors, such as shaft furnace, rotary kiln, Acheson furnace, or fluid bed reactor, at commercial scale, can be challenging and specifically can result in significant entrainment and loss of material to the gas phase. In an aspect, the present disclosure relates to the agglomeration of the particulate graphite feed material (e.g., by using mechanical briquetting or using an agglomerating agent) to produce an agglomerated particulate graphite feed. In addition to the benefit of simplified material handling and storage, the agglomeration of the particulate graphite feed advantageously provides for efficient continuous processing while minimizing losses to the gas phase (e.g., entrainment by the chlorine gas during the chlorination step). Agglomeration of the particulate graphite feed material may be performed using standard industry technology, including but not limited to mechanical briquetting machines, disk and drum pelletizers, pin mixers and high intensity mixer/agglomerators. In an embodiment of the present disclosure, the agglomeration comprises the use of an agglomerating agent. In a further embodiment of the present disclosure, the agglomerating agent comprises a binder, more specifically a carbonaceous binding agent. In yet a further embodiment of the present disclosure, the carbonaceous binding agent is at least one of lignin, starch, modified starch, amylopectin, modified amylopectin, amylose, modified amylose, chitosan, chitin, guar gum, modified guar gum, cellulose, modified cellulose (examples include carboxyalkylated cellulose and carboxymethyl cellulose) and polyvinyl acetate (PVA). In yet a further embodiment of the present disclosure, the carbonaceous binding agent comprises an organic resinous binding material. In yet a further embodiment of the present disclosure, the organic resinous binding material is at least one of petroleum or coal tar pitch. The carbonaceous binding agent may comprise impurities and as such contributes to the overall impurity loading to be removed by the purification process. In an embodiment of the present disclosure, the purification process and the various operating conditions may be tuned taking into account the binder composition. In a further embodiment of the present disclosure, the agglomerates are heat-treated at elevated temperatures (e.g., 400-1200° C.) under inert atmosphere to remove organic volatile matter and carbonize the binder.

Carbon coating is essential when producing high purity particulate graphite particles for use in LiBs. To that effect, the use of a carbonaceous binder advantageously provides for the additional benefit of lowering the specific surface area of the particulate graphite feed material, as measured by the Brunauer-Emmett-Teller (BET) adsorption method, which is advantageous for LiB performance. The specific surface area (BET) is an important property of the purified particulate graphite material. The BET surface area of NFG is generally too high for LiB use and must be reduced, hence the reason why NFG used for LiBs is typically coated with an amorphous carbon layer. In an aspect of the present disclosure, the use of a carbonaceous binding agent to mitigate loss of material to the gas phase also provides for the unexpected benefit of coating the purified particulate graphite material. The agglomeration of the particulate graphite feed material may be conducted using methods known in the art, such as described in U.S. Pat. No. 8,491,677, which is incorporated herein by reference.

In an aspect of the present disclosure, the particulate graphite feed material may be agglomerated using mechanical briquetting, with or without the use of an agglomerating agent. In comparison to agglomeration using low intensity pelletizing equipment such as drum or disk pelletizers, mechanical briquetting offers greater flexibility to control the physical properties of the agglomerates, such as agglomerate size distribution and individual agglomerate density. This allows the agglomerating process to be tailored to obtain the properties of the agglomerates required to optimize the purification process. To that effect, the gas permeability of individual agglomerates can be advantageously controlled by controlling the briquetting pressure, and the gas permeability of a bed of agglomerates can be advantageously controlled by controlling the agglomerate size distribution. In combination, these contribute to controlling the bulk flow of chlorine gas through a bed of agglomerates and the diffusion of chlorine gas through individual agglomerates during the chlorination process. Moreover, the electrical properties of individual agglomerates, such as electrical resistivity, can be advantageously controlled by controlling the briquetting pressure, and the electrical properties of a bed of agglomerates, such as electrical resistivity, can be advantageously controlled by controlling the agglomerate size distribution. In combination, these contribute to controlling heat generation during chlorination for the case where the chlorination reactor is heated by passing electrical current through the bed, as practiced in Acheson furnaces.

In an aspect of the present disclosure, the particulate graphite feed material may be agglomerated using mechanical briquetting without the use of an agglomerating agent. There could be specific contexts where there would be significant potential benefits to agglomerating without addition of an agglomerating agent or binder. To that effect, there is the simple cost saving from not purchasing the binder. There are further cost savings from eliminating the need for a separate agglomerate heat treatment step to remove the organic volatiles from the binder prior to chlorination. Furthermore, it eliminates the need to add water during agglomeration with attendant cost savings due to the elimination of the need to dry the agglomerates prior to chlorination. Yet furthermore, it prevents the addition of impurities from the binder and so lowers the burden on the purification process. Yet furthermore, it prevents any potential negative impact on the electrochemical performance of the product graphite due to the amorphous carbon that comes from the binder not being appropriate. In embodiments wherein an uncoated purified particulate graphite material is produced, the material will be subjected to a separate carbon coating step prior to its use in LiBs. A person skilled in the art would understand that the flexibility offered by having the ability to agglomerate with or without binder will enable the operator of the graphite purification process to optimize the process dependent on the specific context taking into account the properties of the specific impure graphite feed, the desired purified product and specific economic context.

The tap density ($g/cm^3$) is an important property of the purified particulate graphite material. The tap density determines how much effective graphite can be packed into a battery. Higher tap densities provide for better battery performance, which is why “flake” graphite is mechanically processed (spheronized) to change the aspect ratio of the particles to a more spherical shape for better packing. The process for purifying and producing a high purity particulate graphite material of the present disclosure is amenable to processing any type of graphite feed material regardless of morphology. In an embodiment, the graphite feed material may be spheronized.

In an aspect of the present disclosure, the process for purifying and producing a high purity particulate graphite material from a graphite feed material, comprises in-situ recovery and recycling of the leaching agent and/or chlorine gas. These recovery and recycling steps optimize reagent use while minimizing waste production. In an embodiment of the present disclosure, the process for purifying and producing a high purity particulate graphite material from a graphite feed material comprises the use of an industry standard chlor-alkali system to generate the NaOH or KOH solution required for the leaching step, and the $Cl_2$ gas required for the chlorination step. In embodiments of the present disclosure, the system for implementing the process for purifying and producing a high purity particulate graphite material may comprise one or more chlor-alkali systems. In embodiments where more than one chlor-alkali system is present, both NaOH and KOH may be generated respectively. In a further embodiment of the present disclosure, the process may be fed with NaCl or KCl recycled from the neutralization unit operation, with fresh NaCl or KCl brought into the process to make-up for that lost in the solid waste.

In an aspect of the present disclosure, the process for purifying and producing a high purity particulate graphite material from a graphite feed material, advantageously comprises the use of an industry standard chlor-alkali system to generate the alkaline solution required for the leaching step, and the $Cl_2$ gas required for the chlorination step. In an embodiment of the present disclosure, the process plant may be advantageously equipped with buffer storage for the alkaline solution and $Cl_2$ gas generated by the chlor-alkali plant to effectively decouple reagent production from the purification process. This would enable the plant to manage operation of the chlor-alkali based on the spot electricity price (e.g., turn down production during peak electricity demand periods) and thus maximize the financial return of the plant. This would be especially attractive to locations with volatile electricity markets such as those with a high fraction of renewable energy sources.

EXAMPLES

The following examples are included to demonstrate preferred embodiments of the disclosure. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

A sample of natural flake graphite flotation concentrate with a particle size less than 150 micrometers and a total purity, measured by the loss on ignition (LOI) method, of 96.22 weight % carbon, was reacted with flowing chlorine gas at 1400° C. under static bed conditions for 120 minutes in accordance with an embodiment of the present disclosure. After the test, the LOI purity of the graphite was measured to be 99.98 weight % carbon (LOI).

Example 2

A natural flake graphite flotation concentrate with a particle size less than 150 micrometers and a total purity, measured by the loss on ignition (LOI) method, of 96.22 weight % carbon was leached with a 50 weight % sodium hydroxide solution at 140° C. at 10% pulp density for 8 hours. After leaching, the LOI purity of the graphite was measured to be 99.23 weight % carbon. The partially purified graphite was then agglomerated using a starch paste binder at an addition rate of 15 weight % to form micro-pellets of nominally 1 mm diameter. The micro-pellets were then heated to 1000° C. at 5° C./minute in a tube furnace under flowing argon to remove volatile compounds and carbonize the binder. A sample of the carbonized micro-pellets was then reacted with flowing chlorine gas at 1200° C. under fluidized bed conditions for 30 minutes. After the test, the LOI purity of the graphite was measured to be 99.99 weight % carbon.

Example 3

A sample of the purified graphite from Example 2 was milled to a particle size of nominally 20 micrometers. The tap density of the resultant graphite was 0.91 g/$cm^3$ and the BET specific surface area was 3.21 $m^2$/g, which are acceptable values for commercial LiB-grade graphite. The electrochemical performance of the graphite was then measured as follows. An anode slurry was made using polyvinylidene difluoride binder and N-methyl-2-pyrrolidone solvent. The anode slurry was cast onto copper foil and pressed using a calendar roll. Coin cells of 2032 format were constructed using the cast anodes, lithium metal cathodes and an electrolyte consisting of 1.2M lithium hexafluorophosphate in ethylene carbonate: ethyl methyl carbonate: dimethyl carbonate (25:5:70 volume %). The cells were tested by cycling: constant current charge C/20 to 0.005V; constant voltage hold at 0.005V until current drops off to C/50; constant current discharge C/20 to 1.5V; repeat once; and constant current cycling at C/10 between 0.005 and 1.5V. The charge capacity was measured to be 417 mAh/g and the reversible charge capacity was measured to be 350 mAh/g, which are acceptable values for commercial LiB-grade graphite.

Example 4

A sample of spheronized natural flake graphite with a particle size less than 45 micrometers and a total purity, measured by the loss on ignition (LOI) method, of 97.36 weight % carbon, was leached with a 50 weight % sodium hydroxide solution at 140° C. at 10% pulp density for 8 hours. After leaching, the LOI purity of the graphite was measured to be 99.33 weight %. The partially leached graphite was briquetted without agglomerating agent into spheroids of 8 mm diameter. The average strength of the spheroids was measured to be 700 gram force. For reference, the carbon black industry typically requires that agglomerates need a strength >150 gram force to survive typical industrial handling/conveying/storage. The spheroids were reacted with flowing chlorine gas at 1400° C. under static bed conditions for 60 minutes. After the test, the LOI purity of the graphite was measured to be 99.97 weight % carbon (LOI).

While the present disclosure has been described with reference to specific examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety.

The invention claimed is:

1. A process for purifying graphite, the process comprising:
- treating a particulate graphite feed with an agglomerating agent producing an agglomerated particulate graphite feed;
- reacting the agglomerated particulate graphite feed in the presence of a chlorine-containing gas to produce a mixture comprising a purified agglomerated particulate graphite material and a chlorine-containing gas laden with chlorinated impurities; and
- separating the purified agglomerated particulate graphite material from the mixture.

2. The process of claim 1, further comprising leaching the particulate graphite feed using an alkaline leaching solution to produce a slurry; and subjecting the slurry to a separation step, wherein the leaching is performed prior to treating with the agglomerating agent.

3. The process of claim 2, wherein the leaching is performed using an aqueous NaOH solution comprising from about 10 wt. % to about 50 wt. % NaOH.

4. The process of claim 3, further comprising recycling spent NaOH from the leaching back to the process.

5. The process of claim 4, wherein the NaOH solution is neutralized to produce a NaCl solution.

6. The process of claim 2, wherein the leaching is performed at a temperature ranging from about 50° C. to about 150° C.

7. The process of claim 2, wherein the leaching is performed over a period ranging from about 15 minutes to about 16 hours.

8. The process of claim 1, wherein the chlorine-containing gas laden with chlorinated impurities is quenched to remove the impurities.

9. The process of claim 8, further comprising recycling the quenched chlorine-containing gas back to the process.

10. The process of claim 9, wherein the recycling comprises the use of a chlor-alkali system.

11. The process of claim 1, wherein the agglomerating agent comprises a carbonaceous binding agent.

12. The process of claim 11, wherein the carbonaceous binding agent is at least one of lignin, starch, modified starch, amylopectin, modified amylopectin, amylose, modified amylose, chitosan, chitin, guar gum, modified guar gum, cellulose, modified cellulose, and polyvinyl acetate (PVA).

13. The process of claim 1, wherein the agglomerating agent comprises an organic resinous material.

14. The process of claim 13, wherein the organic resinous material is at least one of petroleum or coal tar pitch.

15. The process of 1, wherein the reaction with the chlorine-containing gas is performed at a temperature ranging from about 800° C. to about 1800° C.

16. The process of claim 1, wherein the reaction with the chlorine-containing gas is performed over a period ranging from about 10 minutes to about 8 hours.

17. The process of claim 1, wherein the particulate graphite feed is at least one of synthetic graphite, mined natural flake graphite (NFG) or graphite recovered from spent lithium-ion batteries.

18. The process of claim 1, further comprising milling the purified agglomerated particulate graphite material to a particle size ranging from about 5 to about 30 microns.

19. The process of claim 1, wherein the purified agglomerated particulate graphite material comprises a carbonized coating.

* * * * *